Patented Nov. 23, 1937

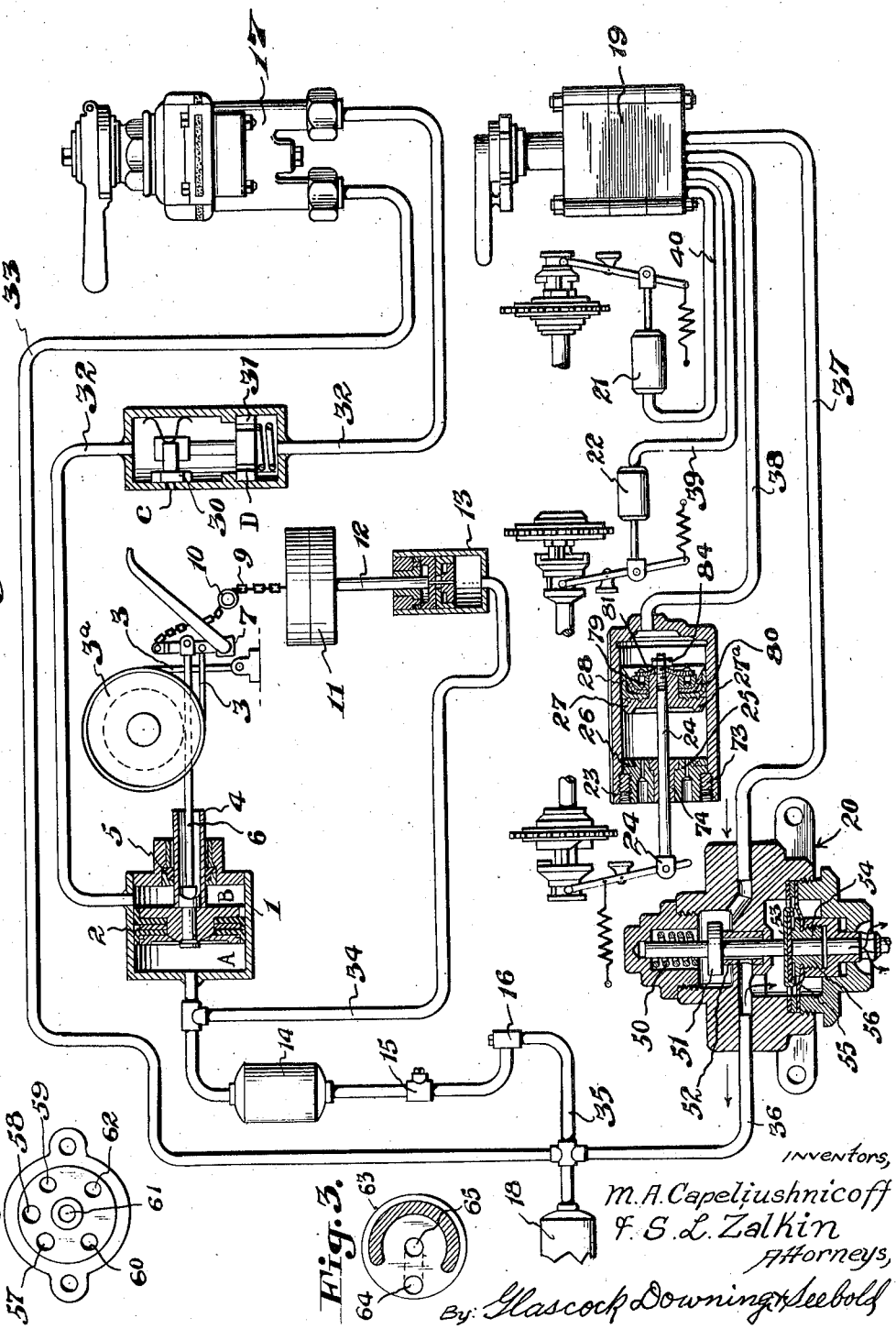

2,100,131

UNITED STATES PATENT OFFICE 2,100,131

DISTANT PNEUMATIC CONTROL FOR A DRILLING RIG

Matvey Alcunovitch Capeliushnicoff and Semien Lvovitch Zalkin, Baku, Union of Soviet Socialist Republics Application December 3, 1934, Serial No. 755,842 In Union of Soviet Socialist Republics November 28, 1933

3 Claims. (Cl. 303—6)

The control of a powerful winch of a drilling rig, which is provided with a band brake (or block brake) and with claw couplings (or friction clutches) for speed changing, is usually effected by means of a system of levers differing from one another in all types of winches only in their construction. Such an imperfect control requires the expenditure of great muscular strength, results in very slow operation of the rig and causes heavy and collective traumatic injuries. The operator, on whose skill and attention depends the success of boring, must work under difficult conditions, under heavy joltings, the rattling noise of the rig, with great physical strain and in an inconvenient and tiresome posture. Effective operation is only possible at the expense of great physical effort of the operators (when sinking or lifting the tools in very deep bores). On the other hand these relatively few operations require a substantial number of operators who cannot be utilized wholly in the boring process.

The overcoming of these drawbacks of a drilling rig manipulation is only possible by means of mechanization of the braking operations and of the operations of engaging the claw couplings and of some other operations.

Numerous attempts to provide the mechanical control of winches of drilling rigs by means of various hydraulic electric pneumatic means have proved unsuccessful owing to increased demands on the brake of the winch of a drilling rig. The main requirements are as follows:

1. The brake must be absolutely safe. In all cases of injuries or faults of installing or of unskilled handling the brake must always maintain a sufficient braking power to prevent accident.

2. The brake must be absolutely controllable to ensure a highly effective boring operation. Each position of the controlling valve handle must correspond to a definite braking power, which must be automatically maintained for an indefinitely long period of time in spite of leakages or the like. The braking power must change gradually at the same rate that the valve handle is moved.

3. The brake must be reliable in service, not requiring much attention, it must be simple in its assembling and cheap in production.

All these requirements are fulfilled according to the present system of the distant pneumatic control for drilling rigs, comprising a novel double-chamber automatic brake for the winch and control means for throwing in the claw couplings.

In order that the invention may be more fully understood and carried into effect it will now be described with reference to the accompanying drawing in which:

Figure 1 shows diagrammatically and partly in detail an arrangement for the distant control of a drilling rig by means of a two-chamber automatic brake, and for the automatic engaging of the claw couplings for speed changing.

Figures 2 and 3 are detail views of the auxiliary valve for the control of the claw couplings.

The two-chamber automatic brake for the winch comprises a brake cylinder 1 in which travels a piston with a two-sided leather packing sleeve 2. The piston is guided by means of a tubular piston rod 4. Within the latter is located a rocking rod 6. The rod 6 is pivotally connected to the crank 7 attached to the shaft of the brake handle 8. If the shaft of the handle 8 is turned, it applies the brake bands 3 to the winch drum 3a. A chain 9 is attached to the upper end of the crank 7 and passes round the roller 10, the other end of this chain being attached to the weight 11. This weight 11 is attached to the rod 12 of a piston in the air cylinder 13.

The first and main distinction of this brake from any pneumatic brakes known heretofore consists therein that in its normal working position this brake always tends to effect full braking by means of a separate and definite volume of compressed air, which constantly presses directly on one side of the piston 2 of the brake cylinder 1, this pressure being maintained constant by means of a separate pressure regulating device 16. The non-return valve 15 prevents this volume of air from flowing back into the air pipe-line.

Said result is obtained by means of the brake cylinder 1 which is divided by the piston 2 into two chambers: the braking chamber "A" and the releasing chamber "B". The braking chamber communicates with the reservoir 14 having a determinate volume, in which the pressure is maintained constant by means of the regulating device 16, said pressure being lower than in the main reservoir 18. The non-return valve 15 prevents the air from flowing back in the case of pressure drop in the main reservoir 18.

The pressure in the braking chamber "A" and in the reservoir 14 is maintained always constant whether the brake is applied or released. The displacement of the piston 2 in the chamber A causes only minor expansion or compression of air. All leakages of air in the system are compensated for by the regulating device 16. If the feeding of fresh compressed air into the system is interrupted, the pressure required for braking will be maintained for a sufficient period of time requisite for taking the measures for precautions (see below).

The constant pressure of compressed air in the braking chamber "A" and in the reservoir 14 being transmitted along the air line 34 into the load cylinder 13 maintains the piston with its rod 12 and with the weight (load) 11 in its raised position in which the chain 9 is slackened and does not restrain the displacement of the crank 7 of the shaft carrying the brake handle 8. The pressure in the braking chamber A can fall only to a predetermined limit, because on attaining this critical low pressure, the weight 11 will descend and compress the air and so maintain a certain pressure and at the same time it will tighten the chain 9, so that the braking will be effected wholly or partially by the falling by gravity of the load 11. (For example, if the normal pressure in the braking chamber "A" is 3.2 atm., the working area of the piston 12 is 50 sq. cm., and the weight of the load 11 is 150 kg. then the force $50 \times 3.2 = 160$ kg. will move the load 11 upwards. The pressure may fall only to 3 atm. when the upwardly directed force acting on the load 11 will be equal to the weight of this load. A further decrease of the pressure and of the braking effect is impossible as the air will be compressed by the weight of load 11.)

For releasing the brake it is necessary to displace the piston 2 to the left, and this may be done only by raising the pressure in the releasing chamber "B". The inlet of air into the releasing chamber "B" for releasing the brake is effected by means of a regulating valve 17. Thus for braking, the air must be let out from the chamber "B" through the pipe 32 by means of the valve 17 of the type shown and described in U. S. Patent No. 1,657,400, and conversely for releasing the brake, the air must be admitted into the chamber "B" by the same valve from the main reservoir 18, where the pressure is higher than in the reservoir 14. Each position of the handle of the valve 17 corresponds to a definite value of pressure in the releasing chamber B and consequently determines the braking effect. The valve 17 is a form of the known railway automatic straight-acting brake valve of the type shown in the above-mentioned U. S. patent.

In the air conducting pipe 32 between the releasing chamber B and the valve 17 is inserted an accelerating valve which comprises the casing 29, the slide valve 30 and the piston 31.

The operation of the accelerating valve 29 is as follows:—

When the handle of the valve 17 is being turned slowly (slow braking), that is to say, when the valve 17 lets the air escape slowly and in small quantities from the chamber B into the atmosphere, then air has sufficient time to pass through the small calibrated openings in the piston 31 without displacing this piston. If the handle is turned fast (quick braking), that is to say, when air escapes rapidly and in large quantities from the chamber B of the braking cylinder 1 into the atmosphere, the air has not time enough to pass through the openings of the piston 31 and the pressure below this piston drops beyond the pressure in the chamber B. Then the piston 31 moves downwardly under the action of the pressure difference and draws with it the slide valve 30. The slide valve 30 opens the port C provided in the casing 29 thus permitting the air to escape quickly into the atmosphere and promoting a very rapid braking.

The principle of operation of the double-chamber automatic brake for the winches is as follows:

The compressed air having a predetermined constant pressure (3.5 atm.) maintained in the reservoir 14 and in the chamber A by means of the pressure regulator (reduction valve) 16 presses immediately against the piston 2 of the brake cylinder 1. This effort is transmitted through the piston-rod to the crank 7 which latter turns the handle 8 and applies the brake bands, so that braking takes place.

In order to release the brake the pressure must be increased in the release chamber B by means of the main valve 17. The effective area of the chamber B being smaller than the area of the chamber A (a portion of this area being occupied by the piston-rod 4), it is necessary in order to fully release the brake to increase the pressure in the chamber B making it about 0.3–0.5 atm. higher than the pressure in the chamber A. The control valve 17 is adjusted in such a manner, that while its handle is in its extreme left position the required excess of pressure is obtained, and consequently the full release takes place. If the pressure in the main air reservoir drops under its normal value (4–5 atm.) but does not fall below the pressure in the reservoir 14, the braking mechanical effort will be in no way reduced, but a full release of the brake becomes impossible. Since it will be impossible in this case to create by means of the valve 17 a pressure in the chamber B which will be higher than in the chamber A and in the reservoir 14, so that the sinking of light tools (such as a hook, one rod, four tubes or the like) will be impeded and all sinking and lifting operations obstructed. This phenomenon will serve as a quite sure signal showing that there exists an abnormal drop of pressure in the main reservoir and that the further gradual release of the brake will be dangerous.

The working pressure existing in the reservoir 14 and in the chamber A is also maintained (by means of the pipe 34) in the weight-loaded cylinder 13, so that the weight 11 is forced to remain in its upper position. In this case the untightened chain 9 lies loosely on the roller 10 and does not hinder the turning of the crank 7 and the normal process of releasing or applying of the brake. If the pressure in the main reservoir 18 drops, the pressure in the brake cylinder still subsists for a long while due to the check valve 15. The slow dropping of pressure caused by the leakage of air can continue only until a certain limit, depending upon the diameter of the cylinder 13 and the weight of the load 11, after which the load 11 begins to sink and to compress the air to make up the leakage losses. At the same time the sinking load will stretch the chain 9 thus effecting a graduated transition of the brake from pneumatic to gravity braking.

The restoration of pressure in the main reservoir will automatically return the braking conditions from the gravity-actuated to air-actuated braking and the brake will become charged. The charging over of the brake is not accompanied by the release of the brake. Every fault in the valve 17, in the accelerating valve 29 or in the air conducting pipes will necessarily provoke full braking owing to the pressure drop in the release chamber B. Every fault in the reservoir 14 will result in a smooth braking of the drum by the load 11.

Such a braking arrangement has the following useful features that are especially desirable for the winches of the drilling rigs:

1. Absolute safety and reliability of the brake. In no cases of a fault or injury a spontaneous release of the brake is possible. The drop of pressure below its normal value in the main reservoir does not reduce the mechanical braking effort but prevents a complete release and makes impossible the sinking and lifting operations, since the complete release is only possible if an elevated pressure exists in the chamber B.

2. The braking effect and the rate of its change corresponds strictly with the change of position of the handle of the valve 17. The position of this handle determines a given braking effect for an unlimited period of time independently of any other conditions. This property of the brake imparts to it an exceptional flexibility and ease of control and the possibility of "feeling" the weight of the working tool in accordance with the position of the valve handle at the beginning of the motion of the tool (at its sinking into the well).

Automatic drilling

Having found (by turning the brake valve handle) the required braking effort for the given sinking operation, we can obtain a very smooth, uniform, safe and easily adjustable movement of the sinking tool towards the bottom of the well.

The adjustment of sinking movement of the tool against the bottom of the well is being effected by means of a gradual release of the brake until the rate of release attains a value which is determined by the weight of the tools and by the predetermined pressure exerted against the bottom. This release is effected by increasing the pressure in the release chamber B, for which purpose, as we know, the handle of the valve 17 is turned to the left.

Engaging of the claw couplings

The engaging of the claw couplings (Fig. 1) is effected by means of the cylinders 21 22, 23 arranged as follows:

The piston rod 24 of the cylinder 23 is connected to the fork of the coupling. The piston 27 attached to the piston rod 24 carries the packing sleeve 28. When engaging the coupling the recess of the piston 27 comes in contact with the rubber ring 26 provided in the cover 25 which may be adjusted axially, for instance, by screwing it into the cylinder body 23. Thus is realized on the one hand the air-tight sealing at the engaged state of the coupling, and on the other hand the relief of the coupling parts from destructive efforts developed during the rotation and the prevention from sticking, because one can obtain between the claws a play equal to 1 or 2 millimeters. In the meantime the possibility of a spontaneous disengaging of the claw couplings is excluded. All the cylinders are controlled by means of the controlling valve 19 and the starting valve 20.

The cylinder 23 is shown in Fig. 1. It comprises the piston rod 24 carrying the disc 27 which is provided with a ring edge 27a. The edge 27a of the disc 27 abuts against the rubber ring 26, and in such manner the air-tightness of the cylinder is obtained and the stroke of the piston is limited.

The principle of operation has been explained above.

The air from the main reservoir 18 (Fig. 1) passes through the pipe 36 into the valve 20 and thereupon through 37 into the valve 19, and from this valve depending upon its position through the pipes 38, 39, 40 into the slow speed cylinder 23, high speed cylinder 22, rotor 21 etc.

The valve 20 is actuated by a slight pressing on the foot pedal, the rate of depressing, determining the air pressure and consequently the effort acting on the engaging claws; thus it is possible to engage the coupling with a slight pressing which may be augmented after the coupling has engaged.

The principle of operation of the valve 20 is as follows: (see Fig. 2):

The main working parts of this valve are: the inlet valve 51 which is forced by the spring 50 to its seat (the bronze bushing 52). The lower tail portion of the valve 51 bears against the metal disc 53 which is fastened to the leather diaphragm 54 provided with openings for the passage of air. This diaphragm adjoins to the hollow cap 56 consisting of two pieces interconnected by screwing, between which pieces an airtight diaphragm 55 is clamped.

The valve 20 operates in the following manner;

By depressing the foot pedal the hollow cap 56 is first forced against the leather diaphragm 54 and then together with that diaphragm is pressed against the valve 51. This valve compresses the spring 50 and is lifted upwards, so that air flowing from the main reservoir 18 to the starting valve 20 (see Fig. 1) will pass (as indicated by an arrow on Fig. 2) underneath the valve 51 into the cavity under the diaphragm 54 and as shown by arrows will flow through the pipe 37 (Fig. 1) into the valve 19.

Upon release of the foot pedal the cap 56 together with the diaphragms 54 and 55 will retreat from the valve 51, so that this valve will regain its seat 52 and will interrupt the admission of air. Thereupon due to the air pressure the diaphragm 55 together with the cap 56 will retreat from the diaphragm 54 and the air will escape into the atmosphere through the opening appearing in the cap 56 (as is shown by arrows).

The escape into the atmosphere may be obtained also by means of the valve 19 (Fig. 1). This valve has the usual slide valve type arrangement, but the slide valve is of special design. The principle of operation of the valve may be seen on Fig. 3. The face of the valve (57—62) has a number of through passages: the passage 61 communicates with the inlet valve, the passage 58 with the atmosphere and other passages (57, 59, 62) communicate with respective cylinders which serve for engaging the claw couplings. The valve itself (63, 64, 65) is provided with a semi-annular recess 63 on its working surface and has an inner passage with two outlet openings 64 and 65. When the valve is in its closed position the recess 63 overlaps the openings 60, 57, 58, 59 and 62 of the valve face so that they all communicate with each other and with the outer air, whereas the air which is admitted by the starting valve 20 (Fig. 1) into the opening 65 of the valve 19 cannot pass into the opening 64. When turning the valve into a position, in which the opening 64 of the valve coincides (registers) with the opening 60 of the valve face, then the recess 63 will, as in the former case, connect the openings 57, 59 and 62 with each other and with the outer air (through the opening 58) and to prevent the air from passing into other cylinders which need not be actuated. The air which enters into the opening 65 of the valve 19 will flow through the opening 64 into the passage 66 of the valve face and further into the corresponding cylinder which is to be actuated for engaging the corresponding coupling. Thus turning the valve 19 into the position corresponding to one of the openings 60, 57, 58 . . . etc. (Fig. 3) and pressing upon the foot pedal of the valve 29 (Fig. 1) it is possible to obtain the throwing in of the cylinder 21, 22, to let air out into the atmosphere (through the passage 58) etc. Thus is facilitated and accelerated the engaging of a coupling and at the same time a blocking action is obtained preventing simultaneous actuating of two or more cylinders (two or more claw couplings).

We claim:

1. A pneumatic control system for a drilling rig comprising a rotatable member and a brake member adapted to be applied to or released from said rotatable member, a brake cylinder, a piston in said cylinder dividing the latter into two chambers, means connecting said piston with said brake member, an air reservoir, means including a regulating device, and a non-return valve for maintaining the pressure in said reservoir at a predetermined value, and means connecting said reservoir with one of said chambers whereby the piston is subjected to a predetermined air pressure constantly acting through said connecting means to apply said brake member.

2. A pneumatic control system as claimed in claim 1 characterized by the provision of auxiliary actuating means connecting with said brake member and operable to effectively apply the latter to the rotatable member, means connected with said reservoir for counter-acting said auxiliary actuating means, said actuating means being released on reduction of air pressure and acting to apply said brake member.

3. A pneumatic control system as claimed in claim 1 characterized by the provision of means connected with the other chamber for varying the pressure therein relatively to the pressure in the first mentioned chamber to cause displacement of the piston and the variable application of the brake member, said last mentioned means including a manually operable valve.

MATVEY ALCUNOVITCH CAPELIUSHNICOFF.
SEMIEN LVOVITCH ZALKIN.